(12) United States Patent
Pradeep et al.

(10) Patent No.: US 10,178,156 B2
(45) Date of Patent: Jan. 8, 2019

(54) EXTRACTION AND CAPTURE OF INFORMATION FROM CUSTOMIZABLE HEADER

(71) Applicant: salesforce.com, inc., San Francisco, CA (US)

(72) Inventors: Aakash Pradeep, Union City, CA (US); Adam Torman, Walnut Creek, CA (US); Alex Warshavsky, Walnut Creek, CA (US); Samarpan Jain, Fremont, CA (US); Soumen Bandyopadhyay, Glen Park, CA (US); Thomas William D'Silva, Fremont, CA (US)

(73) Assignee: SALESFORCE.COM, INC., San Francisco, CA (US)

(*) Notice: Subject to any disclaimer, the term of this patent is extended or adjusted under 35 U.S.C. 154(b) by 129 days.

(21) Appl. No.: 14/688,917

(22) Filed: Apr. 16, 2015

(65) Prior Publication Data

US 2016/0080461 A1 Mar. 17, 2016

Related U.S. Application Data

(60) Provisional application No. 62/048,961, filed on Sep. 11, 2014.

(51) Int. Cl.
*G06F 15/177* (2006.01)
*H04L 29/08* (2006.01)
*G06F 17/30* (2006.01)
*G06F 11/00* (2006.01)

(52) U.S. Cl.
CPC .............. *H04L 67/10* (2013.01); *G06F 11/00* (2013.01); *G06F 17/30398* (2013.01); *H04L 67/02* (2013.01)

(58) Field of Classification Search
CPC ..... H04L 67/02; G06F 11/00; G06F 17/30398
USPC .......................... 709/219, 217, 224; 370/392
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

*Primary Examiner* — David R Lazaro
*Assistant Examiner* — Mariegeorges A Henry
(74) *Attorney, Agent, or Firm* — Schwabe Williamson & Wyatt

(57) ABSTRACT

A database system captures custom information of a header section associated with a logged interaction of a user. The database system may receive a hypertext transfer protocol (http) message including the header section and determine whether the header section includes a predetermined data pattern associated with the custom information added by a second application that is different than a first application which initiated the http message. The database system may extract the custom information from the header section in response to determining that the header section includes the predetermined data pattern. The custom information and event data extracted from the logged interaction of the user may be stored on the database system as a storage element.

17 Claims, 11 Drawing Sheets

(56) References Cited

U.S. PATENT DOCUMENTS

| | | | |
|---|---|---|---|
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 5,983,227 | A | 11/1999 | Nazem et al. |
| 6,014,647 | A * | 1/2000 | Nizzari ............... G06Q 20/10 |
| | | | 705/39 |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,133 | B1 | 4/2001 | Masthoff |
| 6,216,135 | B1 | 4/2001 | Brodersen et al. |
| 6,233,617 | B1 | 5/2001 | Rothwein et al. |
| 6,236,978 | B1 | 5/2001 | Tuzhilin |
| 6,266,669 | B1 | 7/2001 | Brodersen et al. |
| 6,288,717 | B1 | 9/2001 | Dunkle |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,411,949 | B1 | 6/2002 | Schaffer |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec et al. |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 6,907,566 | B1 | 6/2005 | McElfresh et al. |
| 7,062,502 | B1 | 6/2006 | Kesler |
| 7,069,231 | B1 | 6/2006 | Cinarkaya |
| 7,069,497 | B1 | 6/2006 | Desai |
| 7,100,111 | B2 | 8/2006 | McElfresh et al. |
| 7,181,758 | B1 | 2/2007 | Chan |
| 7,269,590 | B2 | 9/2007 | Hull et al. |
| 7,289,976 | B2 | 10/2007 | Kihneman et al. |
| 7,293,006 | B2 * | 11/2007 | Beckius ............... G06Q 10/107 |
| 7,340,411 | B2 | 3/2008 | Cook |
| 7,356,482 | B2 | 4/2008 | Frankland et al. |
| 7,373,599 | B2 | 5/2008 | McElfresh et al. |
| 7,401,094 | B1 | 7/2008 | Kesler |
| 7,406,501 | B2 | 7/2008 | Szeto et al. |
| 7,412,455 | B2 | 8/2008 | Dillon |
| 7,454,509 | B2 | 11/2008 | Boulter et al. |
| 7,508,789 | B2 | 3/2009 | Chan |
| 7,599,935 | B2 | 10/2009 | La Rotonda et al. |
| 7,603,331 | B2 | 10/2009 | Tuzhilin et al. |
| 7,603,483 | B2 | 10/2009 | Psounis et al. |
| 7,620,655 | B2 | 11/2009 | Larsson et al. |
| 7,644,122 | B2 | 1/2010 | Weyer et al. |
| 7,668,861 | B2 | 2/2010 | Steven |
| 7,698,160 | B2 | 4/2010 | Beaven et al. |
| 7,730,478 | B2 | 6/2010 | Weissman |
| 7,747,648 | B1 | 6/2010 | Kraft et al. |
| 7,779,039 | B2 | 8/2010 | Weissman et al. |
| 7,779,475 | B2 | 8/2010 | Jakobson et al. |
| 7,827,208 | B2 | 11/2010 | Bosworth et al. |
| 7,853,881 | B1 | 12/2010 | Aly Assal et al. |
| 7,945,653 | B2 | 5/2011 | Zukerberg et al. |
| 8,005,896 | B2 | 8/2011 | Cheah |
| 8,014,943 | B2 | 9/2011 | Jakobson |
| 8,015,495 | B2 | 9/2011 | Achacoso et al. |
| 8,032,297 | B2 | 10/2011 | Jakobson |
| 8,073,850 | B1 | 12/2011 | Hubbard et al. |
| 8,082,301 | B2 | 12/2011 | Ahlgren et al. |
| 8,095,413 | B1 | 1/2012 | Beaven |
| 8,095,531 | B2 | 1/2012 | Weissman et al. |
| 8,095,594 | B2 | 1/2012 | Beaven et al. |
| 8,103,611 | B2 | 1/2012 | Tuzhilin et al. |
| 8,150,913 | B2 | 4/2012 | Cheah |
| 8,209,308 | B2 | 6/2012 | Rueben et al. |
| 8,209,333 | B2 | 6/2012 | Hubbard et al. |
| 8,275,836 | B2 | 9/2012 | Beaven et al. |
| 8,432,877 | B2 * | 4/2013 | Nagata ............... H04L 12/4641 |
| | | | 370/338 |
| 8,457,545 | B2 | 6/2013 | Chan |
| 8,484,111 | B2 | 7/2013 | Frankland et al. |
| 8,490,025 | B2 | 7/2013 | Jakobson et al. |
| 8,504,411 | B1 * | 8/2013 | Subasic ............... G06Q 30/0201 |
| | | | 705/14.41 |
| 8,504,945 | B2 | 8/2013 | Jakobson et al. |
| 8,510,045 | B2 | 8/2013 | Rueben et al. |
| 8,510,664 | B2 | 8/2013 | Rueben et al. |
| 8,566,301 | B2 | 10/2013 | Rueben et al. |
| 8,566,807 | B1 * | 10/2013 | Colton ............... G06F 9/45529 |
| | | | 717/137 |
| 8,646,103 | B2 | 2/2014 | Jakobson et al. |
| 9,154,418 | B1 * | 10/2015 | Ben-Mayor ............... H04L 45/38 |
| 9,705,688 | B2 * | 7/2017 | Lee ............... H04L 12/1813 |
| 2001/0044791 | A1 | 11/2001 | Richter et al. |
| 2002/0072951 | A1 | 6/2002 | Lee et al. |
| 2002/0082892 | A1 | 6/2002 | Raffel et al. |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0156836 | A1 * | 10/2002 | Janosik, Jr. ............... H04L 67/10 |
| | | | 709/203 |
| 2002/0162090 | A1 | 10/2002 | Parnell et al. |
| 2002/0165742 | A1 | 11/2002 | Robbins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |

(56) References Cited

U.S. PATENT DOCUMENTS

| | | |
|---|---|---|
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0189260 A1* | 8/2008 | Arnold ............... G06F 17/30265 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshaysky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212255 A1* | 8/2013 | Chao ..................... H04L 41/083 709/224 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0307736 A1* | 10/2014 | Krishnan ............... H04L 45/745 370/392 |
| 2014/0359537 A1 | 12/2014 | Jackobson et al. |
| 2015/0066873 A1* | 3/2015 | Voruganti ......... G06F 17/30159 707/692 |

\* cited by examiner 1106 1102

```
Curl https://na1.salesforce.com/services/data/v20.0/sobjects/Account/ -H
"Authorization: Bearer token" -H "X-AddInfo-MyField1: MyValue1" -H
"X-AddInfo-MyField2: MyValue2" "X-SFDC-CF-CustomField_C: CustomValue1"
```
1104

```
String url = "https://na1.salesforce.com";
URL obj = new URL(url);
HttpsURLConnection con = (HttpsURLConnection) obj.openConnection();

//add request header                                          1154
con.setRequestMethod("POST");
con.setRequestProperty("User-Agent", USER_AGENT);
con.setRequestProperty("X-SFDC-AddInfo-MyField1", "MyValue1");
con.setRequestProperty("X-SFDC-AddInfo-MyField2", "MyValue2");
con.setRequestProperty("X-SFDC-AddInfo-CF-CustomField_C", "CustomValue1");

//Send post request
Con.setDoOutput(true);
```
1156

*FIGURE 10B*

EXTRACTION AND CAPTURE OF INFORMATION FROM CUSTOMIZABLE HEADER

CLAIM OF PRIORITY

This application claims the benefit of U.S. Provisional Patent Application 62/048,961 entitled Extracting and Processing Metrics from System Generated Events, by Aakash Pradeep et al., filed Sep. 11, 2014, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to extracting information from headers, and, more specifically, to extracting custom information from a hypertext transfer protocol header.

BACKGROUND

"Cloud computing" services provide shared resources, software, and information to computers and other devices upon request or on demand. Cloud computing typically involves the over-the-Internet provision of dynamically-scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 10A shows an example script prompting a device to embed custom information within a header section of a communication.

FIG. 10B shows another example script prompting a device to embed custom information within a header section of a communication.

DETAILED DESCRIPTION

Figure 1A:
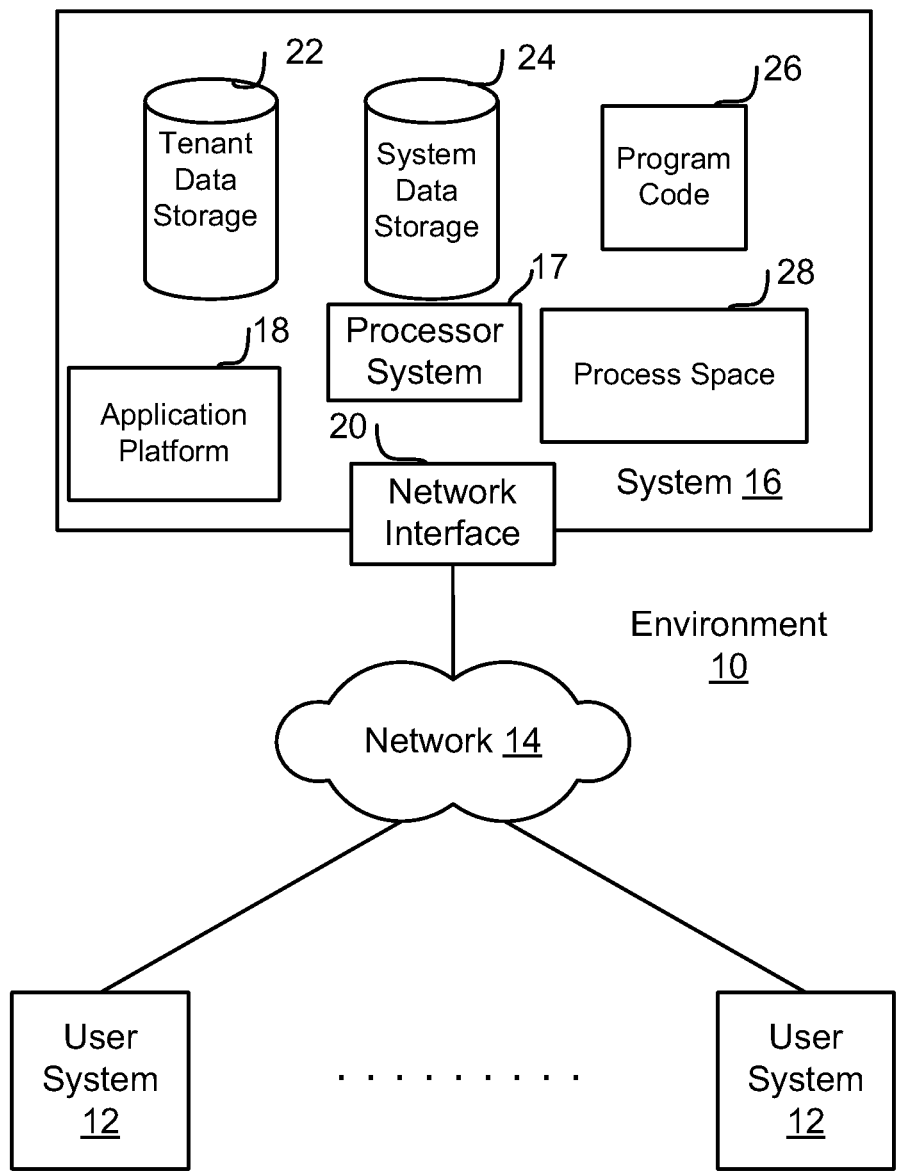
FIG. 1A shows a block diagram of an example environment in which an on-demand database service can be used according to some implementations.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for extracting information from headers, and, more specifically, for extracting custom information from a hypertext transfer protocol (http) header.

In response to a logged interaction of a user, a communication may be generated and transmitted across a network to a database system for storage and analysis. The communication may include auto-generated headers and event data associated with the logged interaction of the user. Often information additional to the auto-generated header and event data is desired to provide for a more in-depth analysis of the logged interaction of the user. However, adding desired information to a plurality of communications upon generation may be labor-intensive and time-consuming as the task involves writing code across a variety of different programming languages associated with the plurality of communications.

The database system may determine that a received communication includes a predetermined data pattern and custom information added subsequently to the generation of the communication. For example, the database system may receive a http message and parse a header section of the http message for the predetermined data pattern.

In response to determining that the received communication includes the predetermined data pattern, the database system may extract the custom information associated with the predetermined data pattern from the header section. The database system may store the extracted custom information along with event data included in the communication.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VB Script, and many other programming languages as are well known may be used. (Java™ is a trademark of Sun Microsystems, Inc.).

Figure 1B:
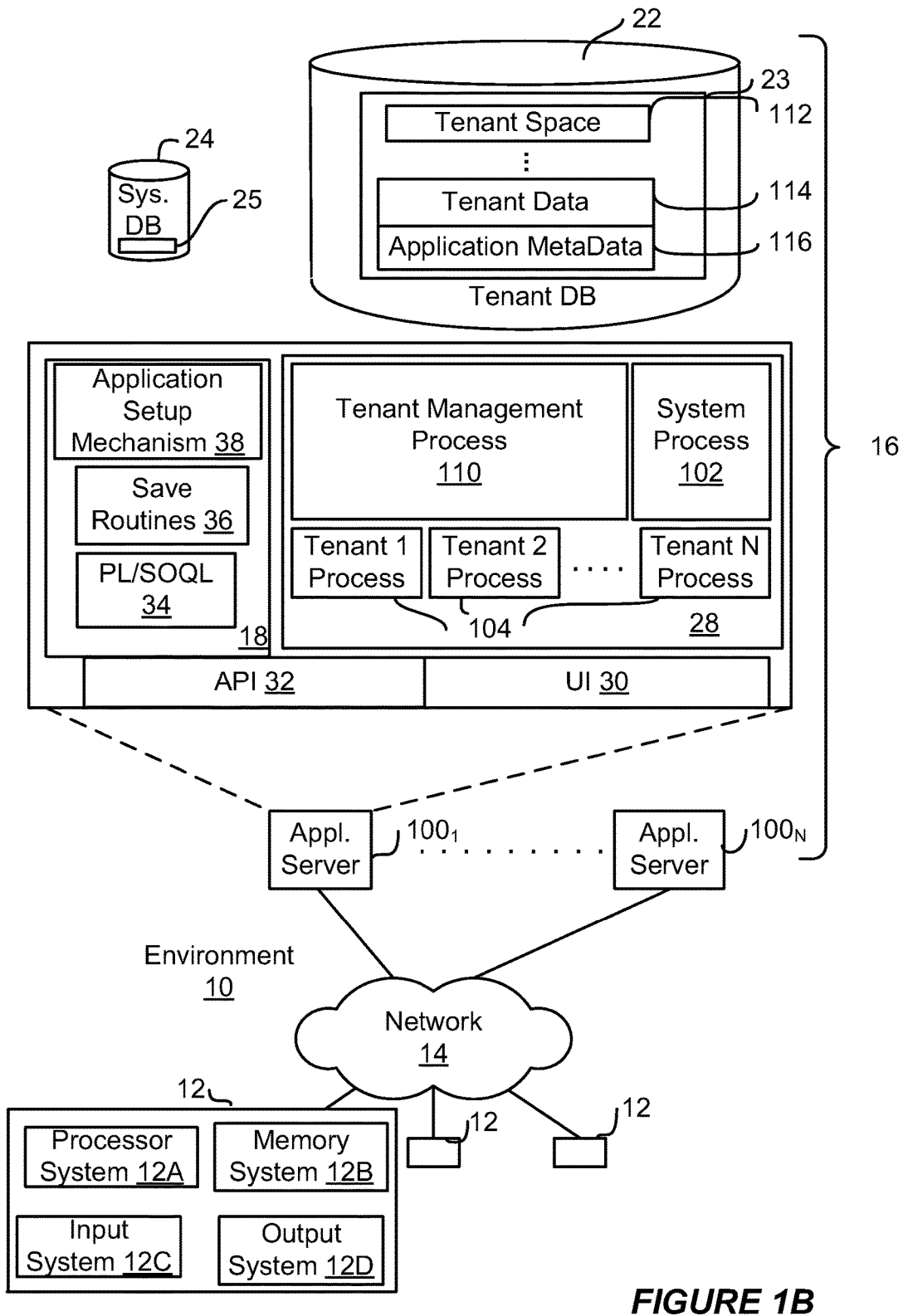
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers 100₁-100N. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server 100₁ can be coupled via the network 14 (for example, the Internet), another application server 100N-1 can be coupled via a direct network link, and another application server 100N can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
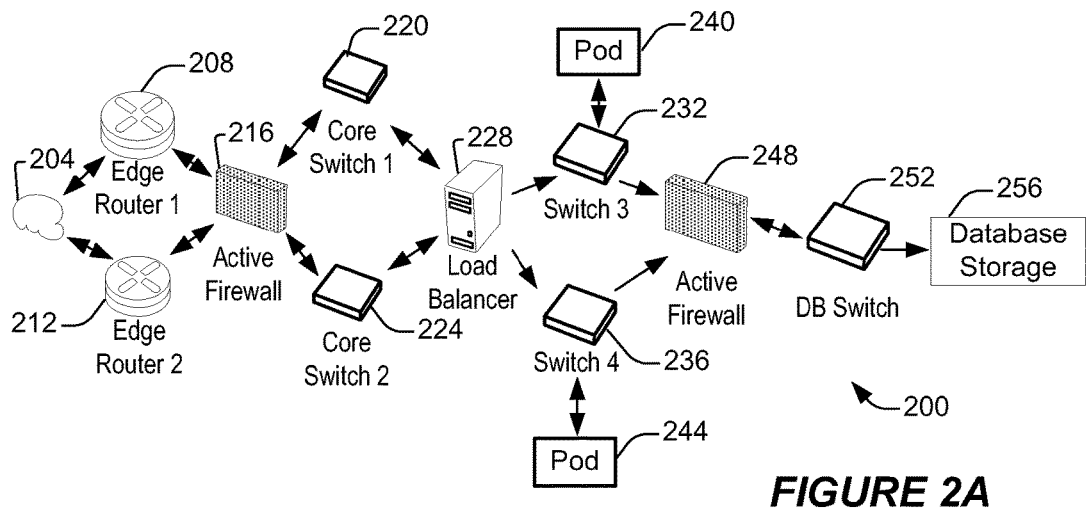
FIG. 2A shows a system diagram of example architectural components of an on-demand database service environment according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
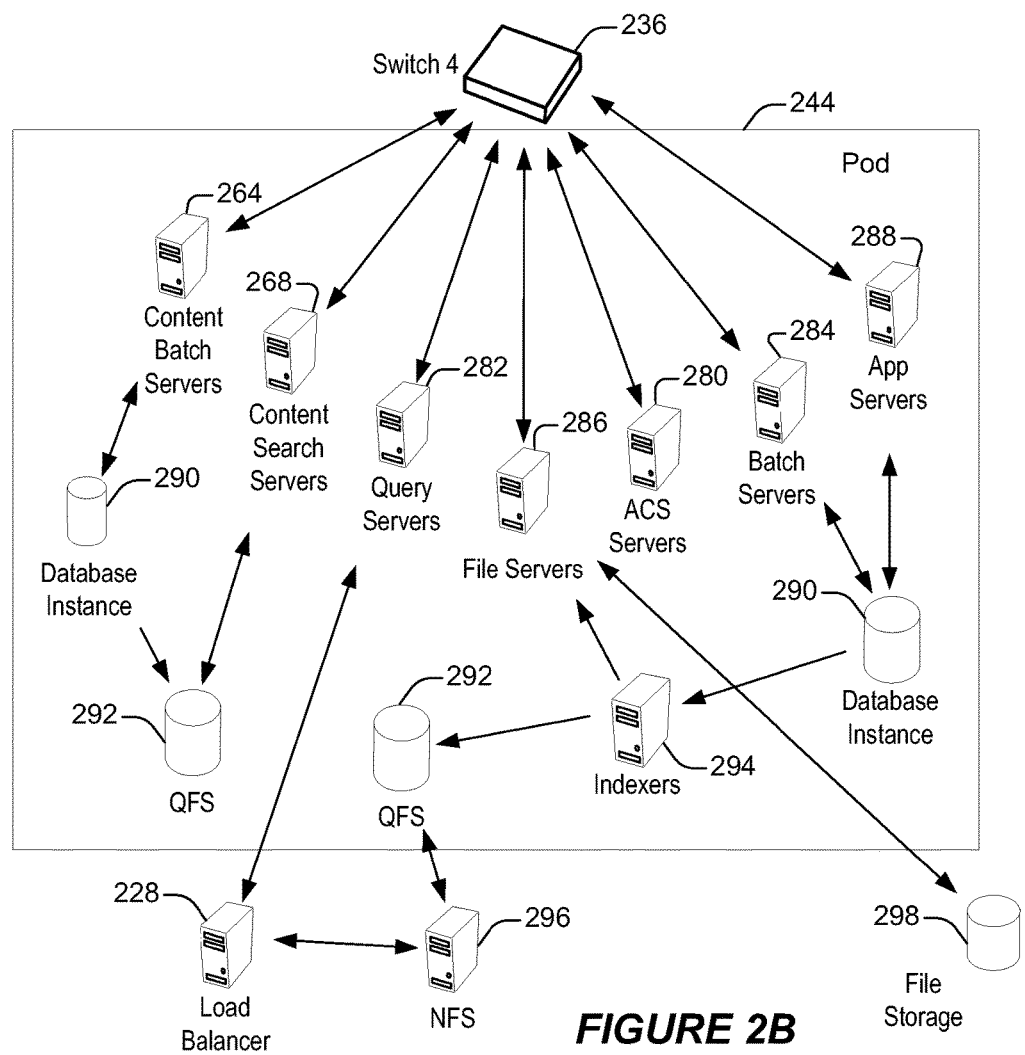
FIG. 2B shows a system diagram further illustrating example architectural components of an on-demand database service environment according to some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file force servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file force servers 286 can manage requests for information stored in the Fileforce storage 298. The Fileforce storage 298 can store information such as documents, images, and basic large objects (BLOBs). By managing requests for information using the file force servers 286, the image footprint on the database can be reduced. The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, the QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database 290 or QFS 292. The index information can be provided to file force servers 286 or the QFS 292.

Figure 3:
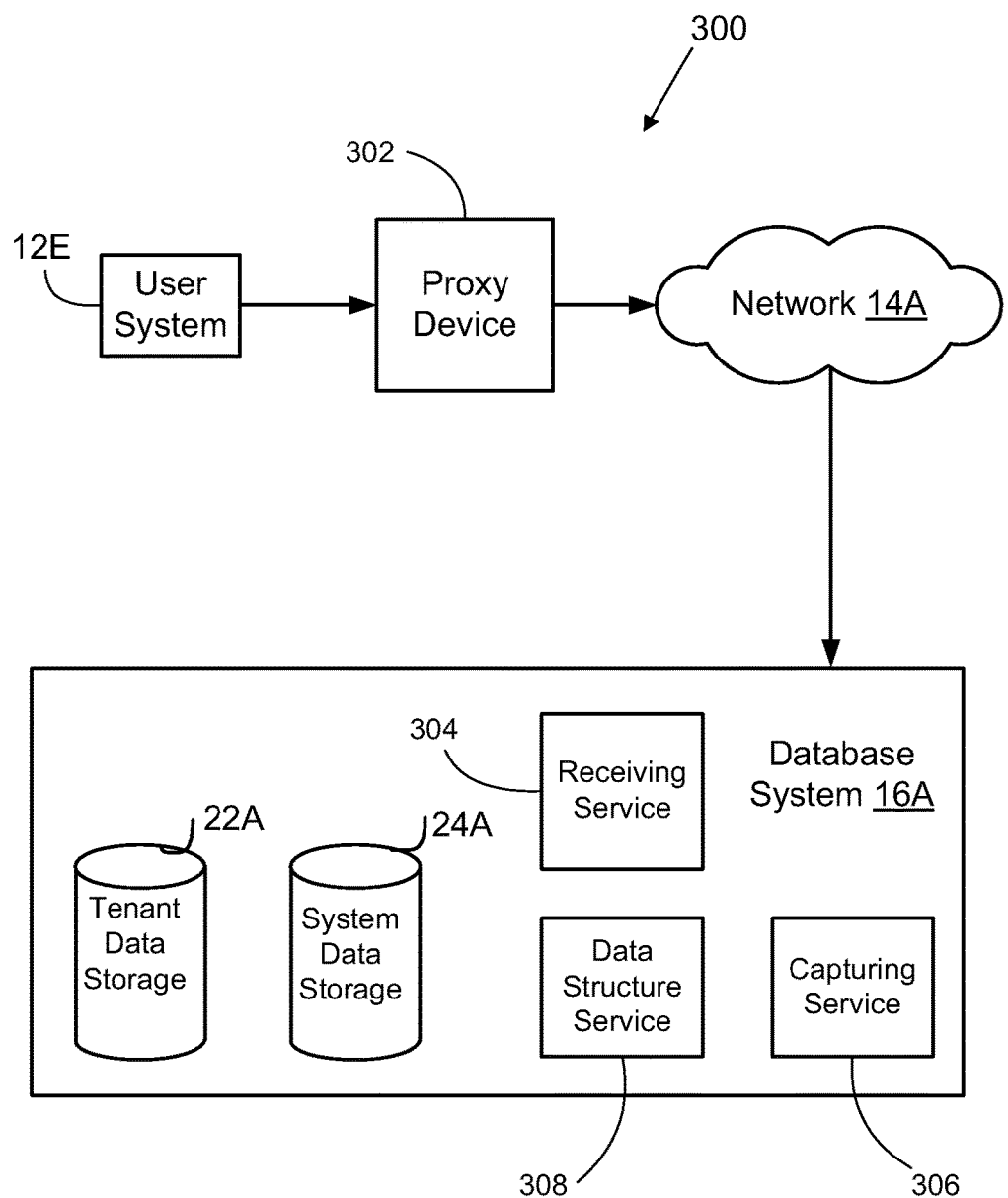
FIG. 3 shows a block diagram of an example environment in which a database system captures and extracts custom information from a header section.

FIG. 3 shows a block diagram of an example environment 300 in which a database system 16A captures and extracts custom information from a header section. A proxy device 302 may be located between user system 12E, which generates a communication in response to a user interaction, and a network 14A, which is used for transmitting the communication to a database system 16A. The proxy device 302 may be configured to intercept the communication as it is transmitted from the user system 12E without interruption to operation of the user system 12E.

In this example, the proxy device 302 is connected to a single user system 12E. Of course the proxy device 302 may be connected to any number of user systems. Further, the proxy device 302 may be configured to intercept communications from a portion or all of the user systems connected to the proxy device 302, while other communications may pass through the proxy device without modification.

The proxy device 302 may receive a communication including a header section. The header section may include one or more headers generated by the user system 12E in response to the user interaction with the user system 12E. For example, the communication may comprise an http message with one or more http headers included in a header section. In some examples, a portion of the one or more headers may be generated by an application programming interface (API) residing on the user system 12E, where the user interacts with the API.

The communication may further include event data associated with the user interaction. The event data may include information defining the type of user interaction that occurred and/or data provided by the user through the user interaction. In some examples, the event data may include information about the user interaction, such as the time the user interaction occurred, changes in the state of the API or user system 12E that occurred in response to the user interaction, data or control fields to which the user interaction was applied, or any combination thereof.

The proxy device 302 may execute an application that embeds the custom information into the header section of the communication. The custom information may be added as one or more additional headers within the header section of the communication. The custom information may include a predetermined data pattern for differentiating the custom information from headers already residing in the header section.

The application may be configured to add the custom information to a portion or all of the communications passing through the proxy device 302. In some examples, the application may be configured to search for an identifier residing in a communication passing through the proxy device 302 and add the custom information or a portion of the custom information in response to determining the communication includes the identifier. The proxy device 302 may transmit the communication with the custom information across the network 14A to the database system 16A.

A receiving service 304 of the database system 16A may receive the communication, including the custom information, transmitted by the proxy device 302. The receiving service 304 may parse the communication into the header section and the event data. In some examples, the header section may be sent to a capturing service 306 of the database system 16A, while the event data surpasses the capturing service 306 and is sent directly to a data structure service 308 of the database system 16A.

The receiving service 304 may additionally receive a copy of the predetermined data pattern. The predetermined data pattern may be compared to the data residing in the header section to identify the custom information added by the proxy device 302. The proxy device 302 may be configured to transmit the predetermined data pattern to the receiving service 304 along with the communication.

In some examples, the predetermined data pattern may reside on one or both of a tenant database 22A and a system database 24A of the database system 16A. The receiving service 304 may retrieve the predetermined data pattern from either the tenant database 22A or the system database 24A and compare the retrieved predetermined data pattern with the data residing in the header section.

In some examples, the receiving service 304 may be configured to access a remote device, such as proxy device 302 or user system 12E, and retrieve the predetermined data pattern from the remote device. The receiving service 304 may receive a communication and, in response to receiving the communication, access the remote device associated with the communication to retrieve the predetermined data pattern.

The capturing service 306 may receive the header section of the communication and the predetermined data pattern from the receiving service 304. The capturing service 306 may be configured to parse the data in the header section to identify the custom information based on identification of the predetermined data pattern included in the custom information.

In response to determining the data residing in the header section includes the predetermined data pattern, the capturing service 306 may extract the custom information from the data. The capturing service 306 may identify the predetermined data pattern in the data and may determine which portion or portions of the data comprises the custom information based on the predetermined data pattern. The capturing service 306 may further parse the custom information into different sections or different groupings of information. For example, the custom information may include a name-value pair and the capturing service 306 may indicate which portion of the name-value pair is the name and which portion is the value.

A data structure service 308 may receive the custom information extracted by the capturing service 306 and the event data associated with the communication. The data structure service 308 may generate a storage element including the custom information and the event data for storage on one or more data storage components, such as the tenant database 22A and the system database 24A. The storage element may maintain an association between the custom information and the event data, indicating that the custom information and the event data were obtained from the same communication.

The storage element may be formatted in a readily accessible and easily searchable format for storage. The data storage components may be configured to allow access to the storage element for displaying the data within the storage element. Further, the data storage components may store storage elements in a searchable format, allowing a user to search for a specific storage element based on any of the characteristics of the storage elements, the data contained in the storage elements, or any combination thereof.

Figure 4A:
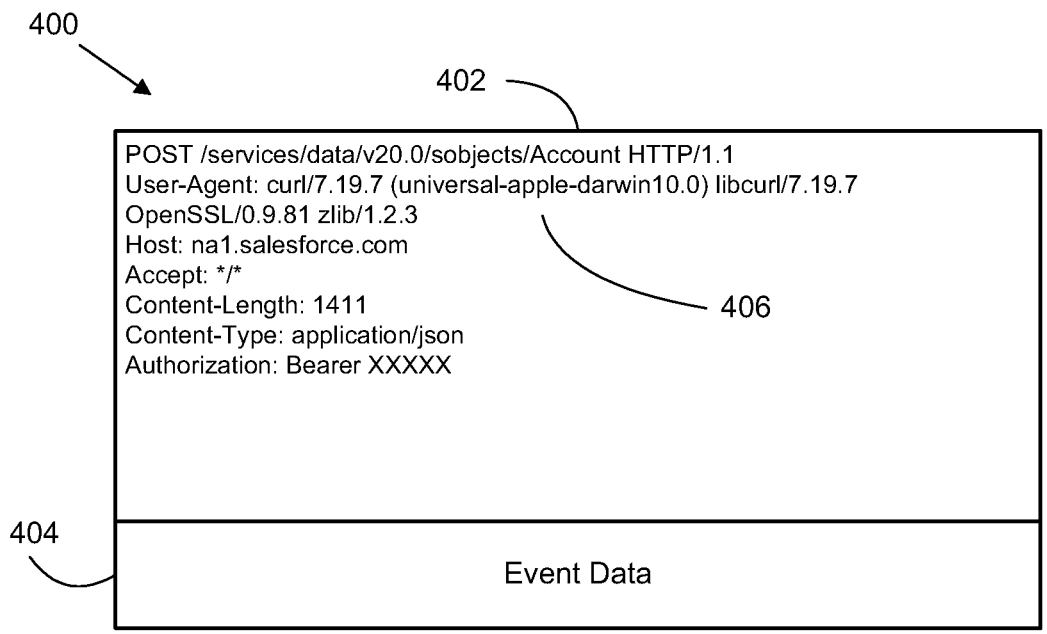
FIG. 4A shows an example communication including a header section.

FIG. 4A shows an example communication 400 including a header section 402. The communication 400 may be generated by a remote device, such as the user system 12E (FIG. 3), and may be transmitted across a network, such as the network 14A (FIG. 3).

The communication 400 may be generated in response to a user interaction with the remote device. The user interaction may include user inputs to an API residing on the remote device. In some examples, the communication 400 may be generated in response to device-generated events, such transmissions of data scheduled for set intervals, updates of the remote device, information requests from other devices, or any combination thereof.

The header section 402 may include auto-generated headers 406 generated by the remote device in response to the user interaction. The auto-generated headers 406 may be generated and added to the header section by the API residing on the remote device. In some examples, the auto-generated headers 406 may be generated and added to the header section 402 by a network interface residing on the remote device.

The API or the network interface may include computer code instructing the remote device to generate and add the auto-generated headers 406 to the header section 402. Often this computer code is inaccessible, or difficult to access, by a user of the remote device. Therefore, it is at least time consuming and at most impossible for a user of the remote device to access the computer code and to modify the information provided by the auto-generated headers 406.

The auto-generated headers 406 may include information for transmittal and identification of the communication by the remote device. The auto-generated headers 406 may include such information as a user identification, a time stamp, a browser used, an Internet protocol address, a Uniform Resource Locator which referred the user, the remote device that generated the communication, an identifier for the host network, content length, content type, the application generating the communication, the computer language of the communication, the authorization for the communication, or any combination thereof. In some examples, the auto-generated header 406 may include additional information unique to the API or the network interface, such as information identifying the API or the network interface.

The capturing service 306 may parse the header section for a predetermined data pattern. In some examples, the capturing service 306 may parse the header section for occurrences of more than one predetermined data pattern. The database system 16A may be configured to access a list of predetermined data patterns for use in parsing the header section. The capturing service 306 may determine each instance of the predetermined data patterns from the list appearing within the header section. Further, the capturing service 306 may be configured to extract the custom information associated with each predetermined data pattern in the list.

In some examples, transmission of the communication 400 may be delayed from the when the user generated event occurs. For example, the communication 400 may be stored on the user system when the user system is unable to communicate with a proxy device, such as the proxy device 302, or a network, such as the network 14A. The delayed communication 400 may then be transmitted in response to the user system establishing a communication link with the proxy device or the network.

Event data 404 may be included in the communication 400. The event data 404 may include information associated with the user generated event. The event data 404 may include an indication of the type of the user generated event, the fields and corresponding input of the user generated event, the time the event occurred, the application and/or system generating the event, or any combination thereof.

In some examples, the communication 400 may comprise an http message. Of course the communication 400 may include any type of message that includes a header section and may comprise any programming language, such as Java, C, C++, Perl, HTML, any software programming language, any hardware programming language, or any combination thereof.

Figure 4B:
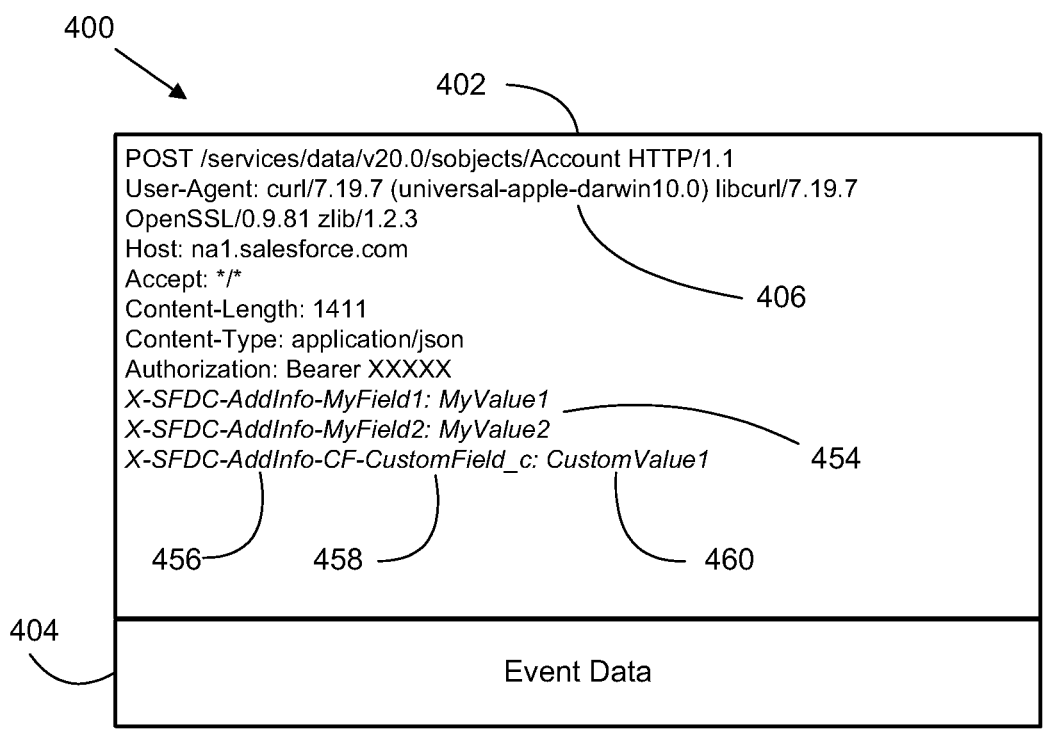
FIG. 4B shows the communication of FIG. 4A with custom information embedded in the header section.

FIG. 4B shows the communication 400 of FIG. 4A with custom information 454 embedded in the header section 402. A proxy device, such as the proxy device 302 (FIG. 3), may embed the custom information 454 in the header section 402 of the communication 400. The custom information 454 may be embedded as one or more headers in the header section 402, in addition to the auto-generated headers 406. In other examples, the custom information 454 may be embedded within the auto-generated headers 406.

The custom information 454 may include a predetermined data pattern 456, a field 458, a value 460, or any combination thereof. The custom information 454 may be fully customizable and may include any data, along with the predetermined data pattern 456, that a user desires to be captured.

In some examples, the custom information 454 to be included in the communication may be defined based on the user whose interaction caused the generation of the communication. The user may be determined through a user login to a system generating the communication, a user login to an application generating the communication, an Internet protocol address of the system generating the communication, other methods of identifying a current user of the system, or any combination thereof. In response to determining the user, the custom information 454 associated with the user may be embedded in any communications generated in response to the user interacting with the system.

The predetermined data pattern 456 may be located at a beginning of a header, followed by the field 458 and the value 460. The predetermined data pattern 456 may comprise a unique string of characters. Of course the predetermined data pattern 456, the field 458 and the value 460 may appear in any order within a header or may be included separately in any of the headers within the header section 402.

In some examples, the predetermined data pattern 456 may be located in a separate header from one or both of the field 458 and the value 460. The predetermined data pattern 456 may be included in a first header, while the field 458 and the value 460 are included in a second header, separate from the first header. Further, the predetermined data pattern 456 may be included in a single header and may indicate that any characters and/or headers appearing in the header section 402 subsequent or prior to the predetermined data pattern 456 should be captured.

Each proxy device 302 may be assigned a unique predetermined data pattern 456 to include in the custom information 454 embedded by the proxy device. A database system, such as the database system 16A (FIG. 3), may identify a source of a communication based on the predetermined data pattern 456. In some examples, unique predetermined data patterns may be assigned to a user, a customer, an entity, or any combination thereof.

The field 458 and the value 460 included in the customer information 454 may be associated with each other and may comprise a name-value pair. The field 458 may include a data field and the value 460 may include a value corresponding to the data field. The field 458 and the value 460 may be separated by a predetermined character in the header, such as a colon, a semi-colon, a comma, or any combination thereof.

In some examples, the field 458 may include a correlation identifier. The correlation identifier may be included in the field 458 of one or more headers and may define a relationship among the values 460 associated with the correlation identifier. When stored data is later accessed, a user may search the stored data based on the correlation identifier and the values 460 associated with the correlation identifier may be returned in response to the search.

The field 458 and/or the value 460 may be defined on the fly. A user may customize the field 458 and/or the value 460 at any time and with any name or value desired. An API operating on a user system, such as the user system 12E (FIG. 3), may include input prompts for defining the field 458 and/or the value 460.

In some examples, the proxy device may retrieve the field 458 and/or the value 460 from the user system and embed the custom information 454, including the field 458 and/or the value 460, within the header section 402. The field 458 and/or the value 460 may be retrieved without input from the user. Further, the field 458 and/or the value 460 may be retrieved without interrupting normal operation of the user system.

Figure 5:
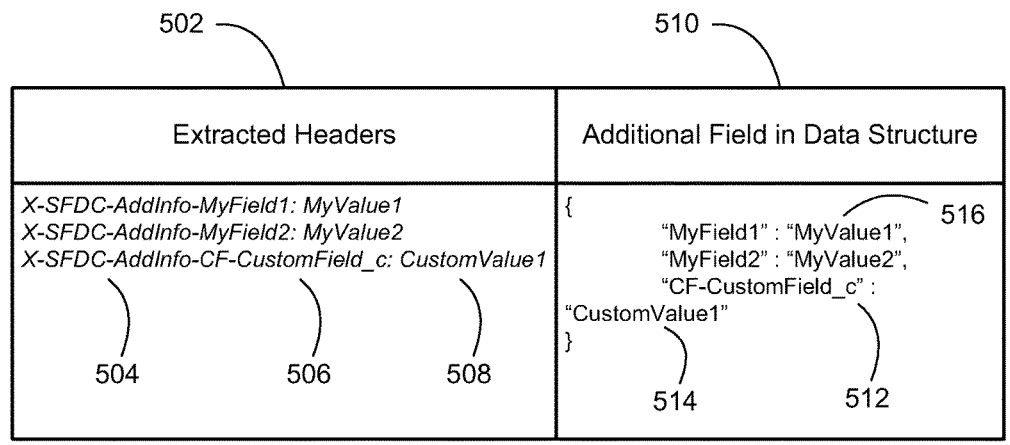
FIG. 5 shows example extracted headers and a corresponding additional field for generating a storage element.

FIG. 5 shows example extracted headers 502 and a corresponding additional field 510 for generating a storage element. The extracted headers 502 may include one or more of the features of any of the headers discussed throughout this disclosure. The extracted headers 502 may include a predetermined data pattern 504 and may be extracted based on the inclusion of the predetermined data pattern 504.

The extracted headers 502 may further include a field 506 and a value 508. One or more associations may exist among the predetermined data pattern 504, the field 506, and the value 508. In some examples, the field 506 and the value 508 may comprise a name-value pair, where an association exists between the name located in the field 506 and the value 508.

In response to being extracted, the extracted headers 502 may be formatted as the additional field 510 for storage by a database system, such as the database system 16A (FIG. 3). The extracted headers 502 may be formatted in JavaScript Object Notation (JSON format), which is easily generated and parsed. Of course, the extracted headers 502 may be formatted in any file format for storage by the database system.

Formatting the extracted headers 502 to generate the additional field 510 may include removing portions of the extracted headers 502, such as the predetermined data pattern 504. The remaining portion of the extracted headers 502 may be formatted for inclusion in the storage element. Formatting may generate a formatted field 512 corresponding to the field 506 and a formatted value 514 corresponding to the value 508. The formatted field 512 and the formatted value 514 may include the same information as the field 506 and the value 508, respectively, although formatted for inclusion in the storage element.

The additional field 510 may maintain any associations included in the extracted headers 502, such as associations among the predetermined data pattern 504, the field 506, the value 508, or any combination thereof. Further, an association may be maintained between the additional field 510 and the communication from which the extracted headers 502 were extracted. In the example where the field 506 and the value 508 comprised a name-value pair, the additional field 510 may maintain an association between the formatted field 512 and the formatted value 514 corresponding to the name-value pair.

The additional field 510 may include an entry 516 corresponding to each header within the extracted headers 502. The entry 516 may include a formatted version of the information included in the corresponding header. Each entry 516 may be separated by a carriage return. Of course, the entries 516 may be separated by other characters, such as commas, semi-colons, periods, tabs, or any combination thereof. Further, the separating character used may correspond to the format of the storage element, such as a comma separated value storage element may include commas to separate the entries 516.

A database system, such as the database system 16A (FIG. 3), may be configured to generate a storage element including the additional field 510 and the event data included in the communication corresponding to the additional field 510. In some examples, the storage element may further include auto-generated headers, such as the auto-generated headers 406 (FIG. 4A), included in the communication.

Generating the storage element may include formatting either or both of the event data and the auto-generated headers to be the same file format as the additional field 510. Further, the storage element may include one or more associations among the additional field 510, the event data, the auto-generated headers, or any combination thereof.

Figure 6:
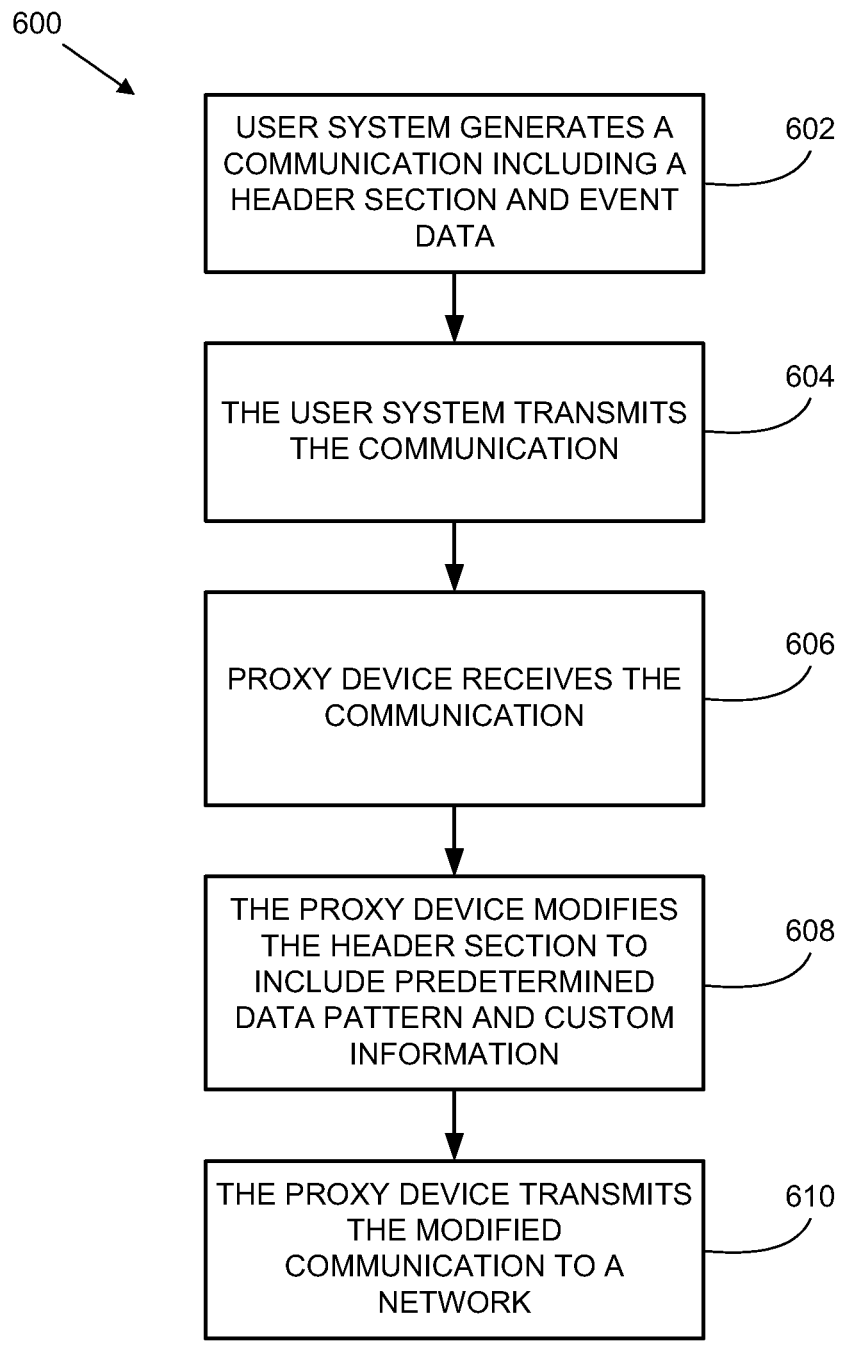
FIG. 6 shows an operational flow diagram illustrating an example process for embedding custom information within a header.

FIG. 6 shows an operational flow diagram illustrating an example process 600 for embedding custom information within a header. In operation 602, a user system, such as the user system 12E (FIG. 3), may generate a communication including a header section and event data. The communication may be generated in response to a user interaction with the user system. In some examples, the communication may comprise an http message.

In operation 604, the user system may transmit the communication to a proxy device, such as the proxy device 302 (FIG. 3). In operation 606, the proxy device may receive the communication from the user system.

In operation 608, the proxy device may modify the header section of the communication by embedding the custom information, including a predetermined data pattern, within the header section. The proxy device may embed the custom information as one or more additional headers within the header section.

In operation 610, the proxy device may transmit the modified communication to a network, such as network 14A (FIG. 3).

Figure 7:
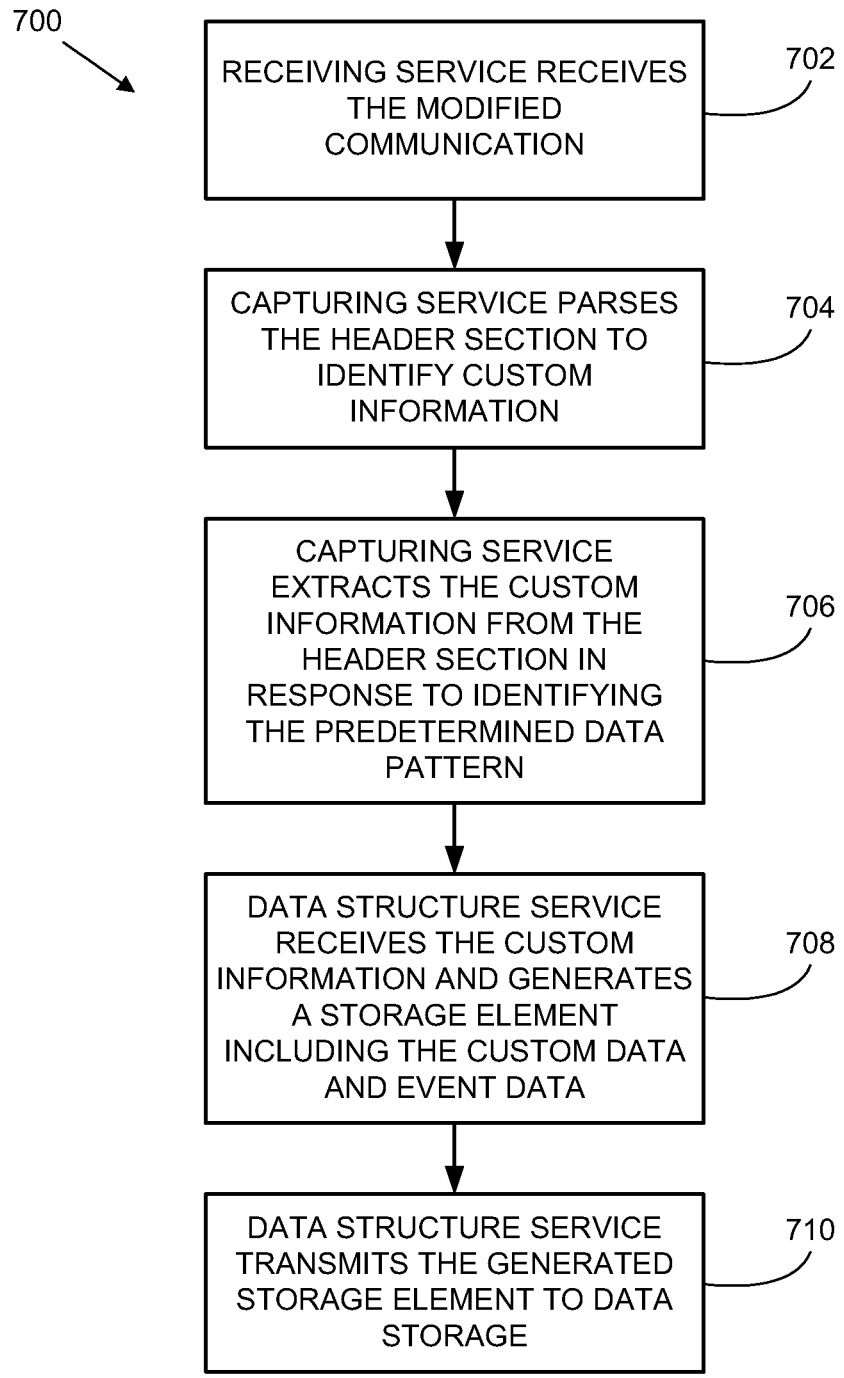
FIG. 7 shows an operational flow diagram illustrating an example process of extracting custom information from a header section and generating a storage element including the custom information.

FIG. 7 shows an operational flow diagram illustrating an example process of extracting custom information from a header section and generating a storage element including the custom information.

In operation 702, a receiving service, such as the receiving service 304 (FIG. 3), may receive a modified communication including the custom information. In some examples, the receiving service may additionally receive a copy of a predetermined data pattern for identifying the custom information within the header section.

In operation 704, a capturing service, such as the capturing service 306 (FIG. 3), may parse the communication for the custom information. Parsing the communication may include identification of the predetermined data pattern located within the communication. The custom information may be identified based on the inclusion of the predetermined data pattern in a header associated with the custom information.

In operation 706, the capturing service may extract the custom information from the header section. The custom information may be extracted by any methods of extraction discussed throughout this disclosure. Extraction of the custom information may occur in response to the identification of the predetermined data pattern within the header associated with the custom information.

In operation 708, a data structure service, such as the data structure service 308 (FIG. 3), may receive the custom information and the event data. In response to receiving the custom information and the event data, the data structure service may generate a storage element including the custom information and the event data. The storage element may be generated by any methods of generation discussed throughout this disclosure. The data included in the storage element may be formatted in one or more different formats, such as JSON format, comma separated value format, extensible markup language format, or any combination thereof.

The storage element may be configured to maintain an association between the custom information with the event data. Further, the storage element may include information identifying the communication, from which the custom information and the event data were extracted, the source that generated the communication, the user interaction that generated the communication, or any combination thereof.

In operation 710, the data structure service may transmit the storage element to data storage, such as the tenant database 22A and/or the system database 24A. The data storage may be configured to allow access to the storage element for displaying the data within the storage element. Further, the data storage may store storage elements in a searchable format, allowing a user to search for a specific storage element based on the custom information, the communication, the event data, or any combination thereof, associated with the storage elements.

Figure 8:
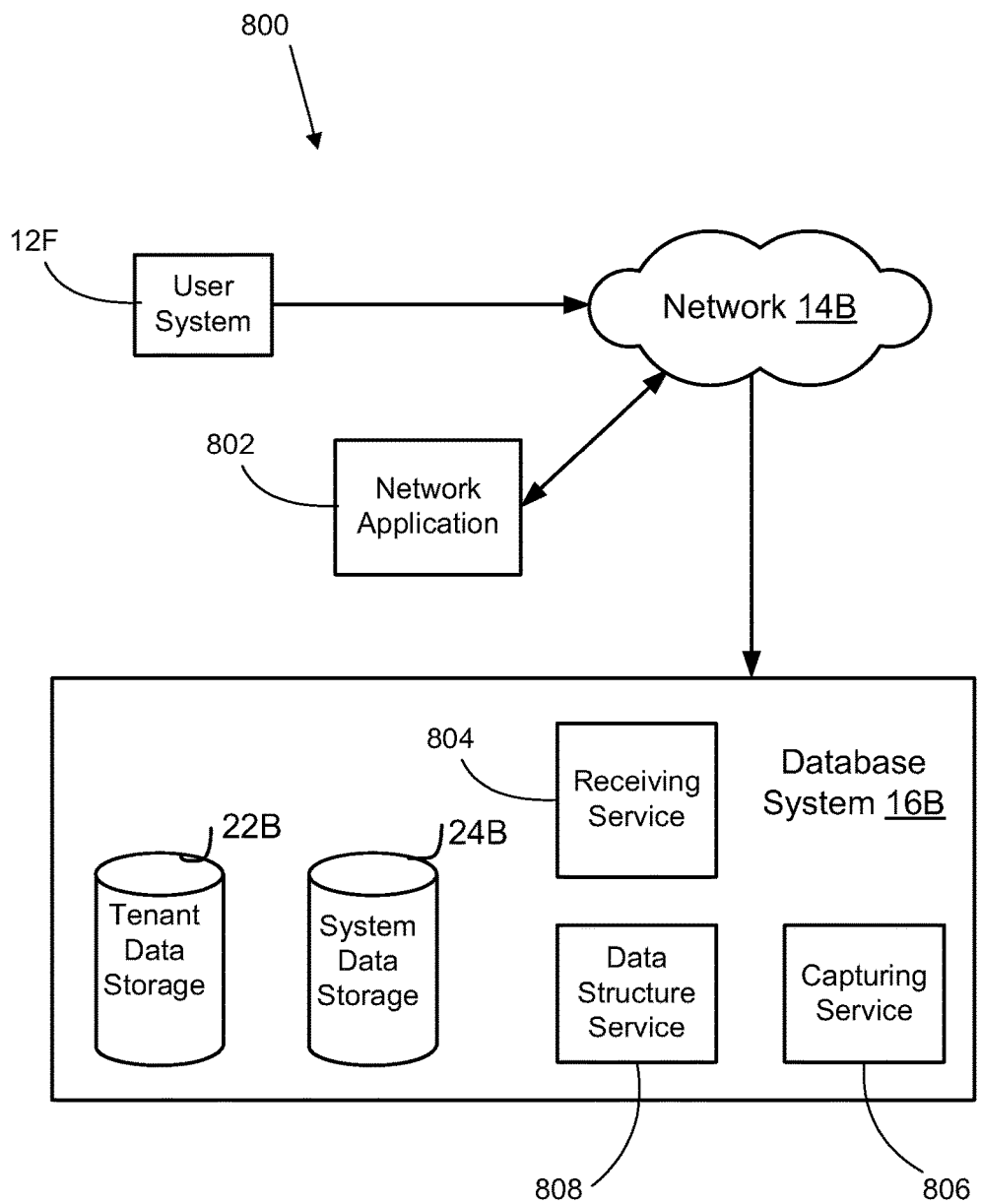
FIG. 8 shows a block diagram of another example environment in which a database system captures and extracts custom information from a header section.

FIG. 8 shows a block diagram of another example environment 800 in which a database system 16B captures and extracts custom information from a header section. The environment 800 may include a network application 802 residing on one or more servers included in a network 14B and the network application 802 may be configured to operate on data passing through the network 14B. The network application 802 may perform one or more of the operations performed by the proxy device 302 (FIG. 3).

The network application 802 may be stored and operate on one or more servers included in the network 14B. The network application 802 may identify communications passing through the network 14B and embed the custom information within the header sections of the communications. In some examples, the network application 802 may be configured to embed the custom information in selected communications passing through the network 14B, where the communications may be selected based on any of the data or identifying characteristics of the communication.

In some examples, the network application 802 may reside in a network API, such as an Internet browser, a messaging service, a network-based program, or any combination thereof. In response to the network API generating a communication, the network application 802 may intercept the communication and embed the custom information in the communication prior to the communication being transmitted from the device on which the network API is operating.

The network application 802 may be configured to intercept the communication without affecting the operation of a user system 12F with which the user is interacting or requiring a user input. The modified communication may then be transmitted across the network 14B to a database system 16B. The database system 16B may include one or more of the features of database system 16A and may perform one or more of the operations performed by database system 16A.

In some examples, the network application 802 may generate a predetermined data pattern in response to intercepting a message from the user system 12F. The network application 802 may be configured to dynamically generate a unique predetermined data pattern for each intercepted communication, where the predetermined data pattern may be used for identifying the source of the communication. A copy of the predetermined data pattern may be transmitted across the network 14B to the database system 16B. The copy of the predetermined data pattern may be used to identify the custom information within the header section of the modified communication.

Figure 9:
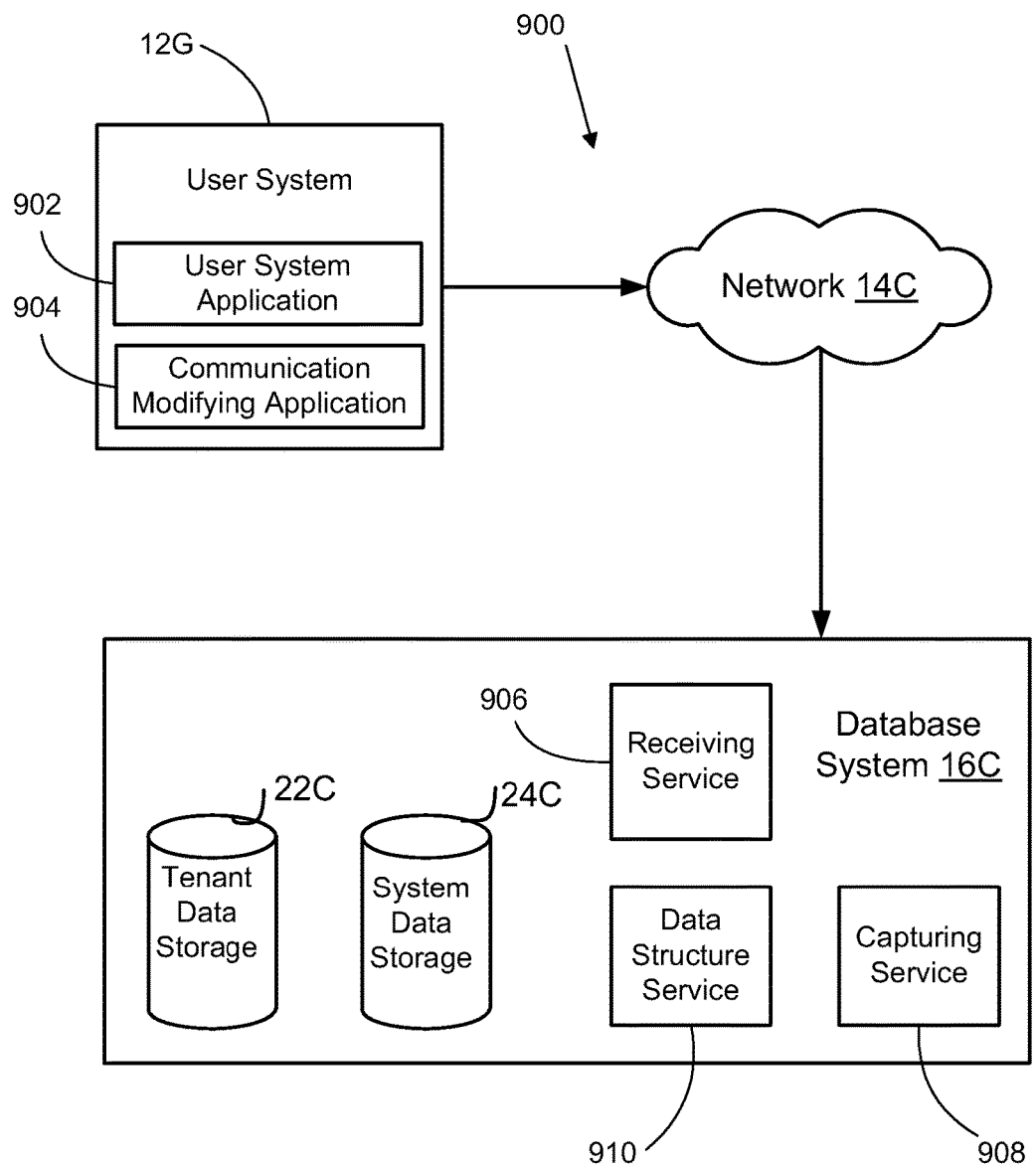
FIG. 9 shows a block diagram of another example environment in which a database system captures and extracts custom information from a header section.

FIG. 9 shows a block diagram of another example environment 900 in which a database system 16C captures and extracts custom information from a header section. A communication modifying application 904 may reside on a user system 12G and may embed the custom information within the header section of communications generated by a user system application 902 residing on the user system 12G. The communication modifying application 904 may perform one or more of the operations performed by the proxy device 302 (FIG. 3) or the network application 802.

The user system application 902 may be configured to generate a communication in response to a user interaction with the user system 12G. Prior to the communication being transmitted from the user system 12G, the communication modifying application 904 may intercept the communication and embed the custom information in the header section of the communication. The user system 12G may then transmit the modified communication across network 14C.

Communication modifying application 904 may be accessed by a user of the user system 12G. Using the communication modifying application 904, the user may be able to define a predetermined data pattern, the custom information to be included within the communication, data to be retrieved from the user system application 902 and included in the communication, data to be retrieved from the user system 12G and included in the communication, or any combination thereof.

The communication modifying application 904 may be configured to run in the background without input from or interruption to the user of the user system 12G. The communication modifying application 904 may be configured such that the user is unable to tell that the custom information is being embedded in a communication prior to the communication being transmitted across network 14C.

In some examples, the communication modifying application 904 may launch a user interface window in response to intercepting a communication from the user system application 902. The user interface window may include prompts for user input of the custom information to be embedded in the header section of the communication. Further, the communication modifying application 904 may allow a user to define when the user interface window should be launched, such as for certain communications, in response to certain user interactions, when a communication is ready to be transmitted to the network 14C, when the network 14C is available for communication with the user system 12G, or any combination thereof.

The modified communication with the embedded custom information may be transmitted across the network 14C to a database system 16C. The database system 16C may include one or more of the features and/or perform one of more of the operations performed by the database system 16A (FIG. 3) or the database system 16B (FIG. 8).

FIG. 10A shows an example script 1102 prompting a device to embed custom information 1104 within a header section of a communication. The script 1102 may be written in a programming language operable on a user system generating the communication or a proxy device intercepting the communication. In this example, the script is written for execution by cURL, although it is to be understood that the script may be written in any software or hardware programming language.

The script 1102 may include application specific code 1106 instructing an application operating on the device to embed the custom information 1104 into the header section of communications generated by the device. Further, the custom information 1104 within the script may be formatted in accordance with the protocol of the application for embedding of the custom information 1104 within the header section.

FIG. 10B shows another example script 1152 prompting a device to embed custom information 1154 within a header section of a communication. The example script 1152 may include one or more of the features of the example script 1102.

In this example, the script 1152 is written using Java programming language. The script 1152 may include application specific code 1156 along with the custom information 1154. The application specific code 1156 may instruct the device to embed the custom information 1154 within the header section of the communication. The custom information 1154 may be formatted in Java programming language protocol for embedding the custom information 1154 within the header section.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method of capturing custom information of a header section associated with a logged interaction of a user, comprising:
    receiving, by a database system, a hypertext transfer protocol (http) message including the header section;
    determining, by the database system, whether the header section, included in the http message, includes a predetermined data pattern associated with the custom information added by a second application that is different than a first application which initiated the http message, wherein the second application is executed by a device that is remote to the database system, and wherein determining whether the header section includes the predetermined data pattern comprises:
        accessing, by the database system, a list of predetermined data patterns; and
        parsing, by the database system, text within the header section for occurrences of the predetermined data patterns from the list;
    determining, by the database system, a source of the http message based on the predetermined data pattern;
    extracting, by the database system, the custom information from the header section, included in the http message, in response to determining that the header section includes the predetermined data pattern; and
    generating, by the database system, a storage element, including the custom information and event data taken from the logged interaction of the user, to be stored on the database system, wherein the storage element indicates the source of the http message.

2. The method of claim 1, wherein the first application is executed by a second device that is different than the device which executes the second application.

3. The method of claim 1, wherein the custom information comprises a name-value pair and the storage element maintains a relationship between a name and a value of the name-value pair.

4. The method of claim 1, wherein the predetermined data pattern and the custom information are added as a single header within the header section of the http message.

5. The method of claim 1, further comprising receiving, by the database system, a transmission defining the predetermined data pattern, wherein the transmission indicates that the predetermined data pattern is associated with the source.

6. The method of claim 1, wherein generating the storage element comprises converting the custom information and the event data to JavaScript Object Notation format.

7. A database system, comprising:
    a processing system;
    a memory device coupled to the processing system, the memory device having instructions stored thereon that, in response to execution by the processing system, cause the processing system to perform operations comprising:
        parsing a header section of a communication associated with a logged interaction of a user for a predetermined data pattern associated with a subsequently added portion of the header section of the communication being added to the header section by a second application that is different than a first application that generates the communication, wherein the second application is executed by a device remote to the database system, and wherein the parsing the header section comprises determining whether a header located in the header section includes the predetermined data pattern;
        determining the user initiated the communication based on the predetermined data pattern;
        extracting the subsequently added portion from the header section of the communication based on the parsing of the header section locating the predetermined data pattern, wherein the extracting the subsequently added portion comprises identifying and extracting a name-value pair following the predetermined data pattern in the header; and
        generating a storage element that associates the subsequently added portion with event data taken from the logged interaction of the user; and
    a distributed database configured to store the storage element, wherein the storage element is associated with the user.

8. The database system of claim 7, wherein the instructions cause the processing system to perform further operations comprising accessing the device that executes the second application to obtain a copy of the predetermined data pattern for parsing the header section.

9. The database system of claim 7, wherein generating the storage element comprises converting the subsequently added portion to JavaScript Object Notation format.

10. The database system of claim 7, wherein the subsequently added portion comprises a correlation identifier and a value associated with the correlation identifier, and wherein the storage element maintains an association between the correlation identifier and the value.

11. The database system of claim 7, wherein the generated storage element includes the name-value pair.

12. The database system of claim 7, wherein the device is a first device and the communication is a first communication, the distributed database is associated with a tenant, the instructions cause the processing system to perform further operations comprising:
    receiving a second communication prior to reception of the first communication, the second communication containing an indication that the predetermined data pattern is assigned to the user, the user associated with the first application that is being executed by a second device when the first communication is initiated, the second device being remote to both the first device and the database system, and
    storing the storage element in the distributed database based on the user being associated with the tenant.

13. A computer program stored on a non-transitory computer readable medium for a database system, the computer program comprising a set of instructions operable to:
    receive, by the database system, a communication associated with a logged interaction of a user, the communication including one or more headers and event data;

parse, by the database system, the one or more headers of the communication for a predetermined data pattern received from a remote device and associated with a custom portion added to the one or more headers via an application executed by the remote device;

determine, by the database system, a source of the communication based on the predetermined data pattern;

extract, by the database system, the custom portion from the one or more headers of the communication in response to locating the predetermined data pattern in the one or more headers during the parsing;

format, by the database system, the extracted custom portion into a structured format;

generate, by the database system, a storage element including the formatted custom portion and the event data; and store, by the database system, the storage element containing the formatted custom portion and the event data, wherein the storage element is associated with the source.

14. The computer program on the non-transitory computer readable medium of claim 13, wherein the application comprises a first application, and wherein the communication is generated by a second application that is separate from the first application.

15. The computer program stored on the non-transitory computer readable medium of claim 14, wherein the second application resides on a user terminal and the first application resides on the remote device.

16. The computer program stored on the non-transitory computer readable medium of claim 13, wherein the custom portion comprises a name-value pair and the storage element maintains an association between a name and a value of the name-value pair.

17. The computer program stored on the non-transitory computer readable medium of claim 13, wherein the predetermined data pattern and the custom portion are located in a same header of the one or more headers.

* * * * *